United States Patent [19]

Werthmann

[11] 4,398,451

[45] Aug. 16, 1983

[54] METHOD OF VENTILATING UNDERGROUND MINES AND IMPROVED BRATTICE CLOTH CONSTRUCTION USEFUL THEREIN

[75] Inventor: Neil J. Werthmann, Severna Park, Md.

[73] Assignee: Polyweave Products, Inc., Severna Park, Md.

[21] Appl. No.: 23,252

[22] Filed: Mar. 23, 1979

Related U.S. Application Data

[63] Continuation-in-part of Ser. No. 838,092, Sep. 3, 1977, abandoned.

[51] Int. Cl.³ .............................................. E21F 1/14
[52] U.S. Cl. ........................................ 98/50; 428/235
[58] Field of Search ................... 98/50; 428/235, 300, 428/301

[56] References Cited

U.S. PATENT DOCUMENTS

| | | | |
|---|---|---|---|
| 2,395,689 | 2/1946 | Sembower, Jr. | 98/50 |
| 2,739,082 | 3/1956 | Bezman et al. | 428/280 |
| 2,943,010 | 6/1960 | Stefl et al. | 428/301 |
| 3,179,551 | 4/1965 | Dudas | 428/280 |
| 3,284,872 | 11/1966 | Closson, Jr. | 428/235 |
| 3,307,990 | 3/1967 | Homier et al. | 428/235 |
| 3,451,885 | 6/1969 | Klein | 428/235 |
| 4,009,649 | 3/1977 | Thimons | 98/50 |
| 4,055,074 | 10/1977 | Thimons | 98/50 |

FOREIGN PATENT DOCUMENTS 1366827 9/1974 United Kingdom .

Primary Examiner—Ronald C. Capossela
Attorney, Agent, or Firm—William J. Daniel

[57] ABSTRACT

An improved brattice cloth construction and method of utilizing the same in the ventilation of underground mines comprising a coherent, strong felt formed from a thick batting or mat of textile staple fibers needle-punched into dense, tightly intertwined and interlocking engagement, a flame retarding chemical impregnant in sufficient amount to impart to felt an acceptable flame resistance, and preferably an openwork substrate disposed within the staple fiber felt with staple fibers needle-punched therethrough and interconnected therewith.

15 Claims, 8 Drawing Figures

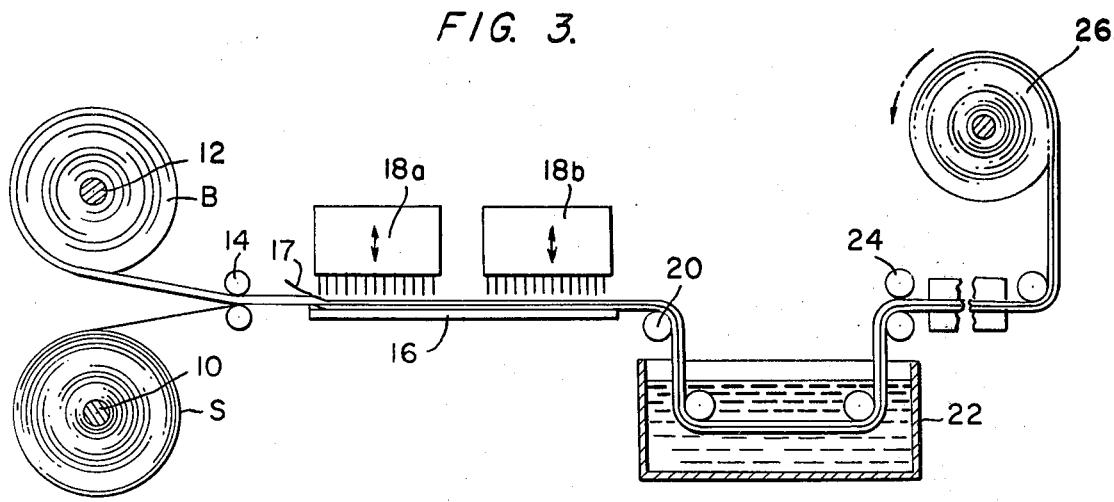
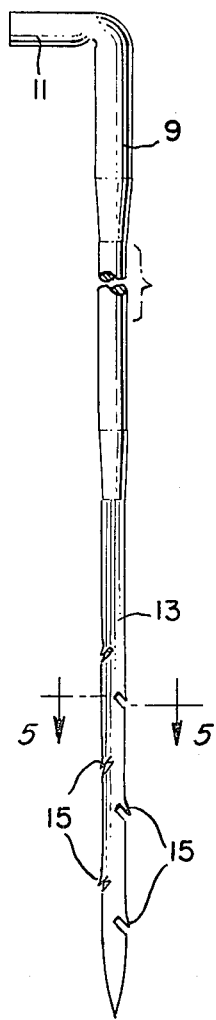
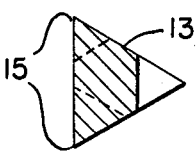
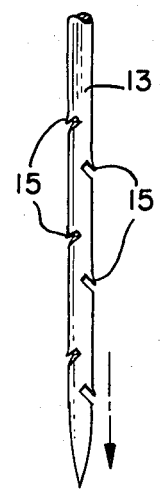
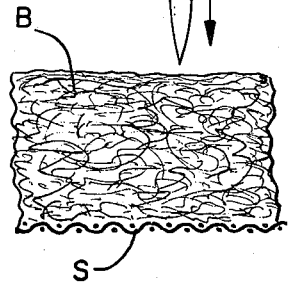
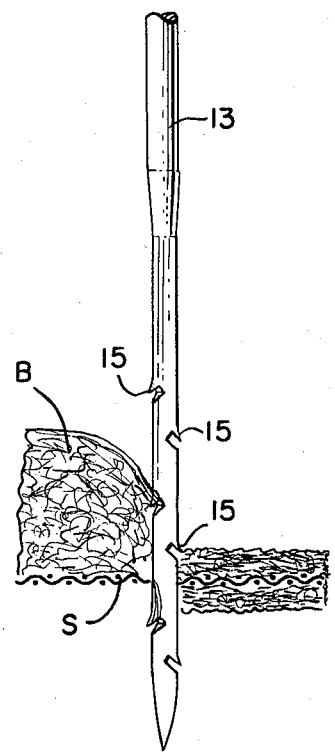

METHOD OF VENTILATING UNDERGROUND MINES AND IMPROVED BRATTICE CLOTH CONSTRUCTION USEFUL THEREIN

CROSS REFERENCE TO RELATED APPLICATIONS

This application is a continuation-in-part of application Ser. No. 838,092, filed Sept. 30, 1977, now abandoned.

FIELD OF THE INVENTION

This invention relates to the field of underground mining and is concerned more particularly with an improved brattice cloth construction for use as ventilating curtains in the ventilation of such mines.

BACKGROUND OF THE INVENTION

In underground mining operations, it is common to sink into the earth shafts which can extend one thousand or more feet in depth in the location of the stratum or layer of the particular ore or other material such as coal to be extracted and then in the course of such extraction to develop tunnels penetrating more or less laterally according to the thickness and direction of the ore stratum which can extend for additional thousands of feet. The extraction ordinarily proceeds by means of the so-called "room and pillar" method in which the ore is removed in localized areas called rooms while leaving intervening areas unmined so as to constitute pillars which aid in supporting the roof over the mine regions in conjunction with other supporting expedients such as roof bolts, bracing and the like.

Two methods of ore extraction are currently in use at least in the mining of coal which is the special concern of this invention—the so-called conventional method and the continuous mining method. In the conventional method, a deep horizontal slot is cut in an appropriate location along a section of the face of the ore seam then being worked, usually at the bottom although sometimes at the top, the face above the slot is drilled for the reception of explosives which are then detonated so as to break quantities of coal loose from the seam. The coal thus dislodged is then collected and removed from the mine by shuttle cars moving through one or more tunnels. In the continuous method, a continuous mining machine cuts away the ore from the face of the seam by means of a cutting head carried at its front end, and collects and transports the ore rearwardly thereof for loading on the shuttle cars for removal as before. In either case and particularly in the instance of continuous mining, substantial quantities of dust are generated notwithstanding the practice of maintaining the cutting instrumentalities under a continuous spray of water, and this airborne dust presents a hazard to the miners from the standpoint of both breathing and risk of explosion.

Moreover, certain deposits of coal have entrained therein large quantities of methane generated during the original formation of the coal in eons past, and as the coal is extracted, the methane escapes and tends to collect along the working face of the mine. The amount of methane released varies from mine to mine with some mines being more highly subject to this phenomenon and being known as "gassy" mines. Methane, of course, is an explosive gas particularly when combined with the proper portions of air, and the majority of the mining disasters through the years can be attributed to explosions caused by the accidental ignition, for instance, by a casually produced spark, of this methane gas.

While mining operators and companies have always been more or less concerned in minimizing the content of dust and methane in the atmosphere within the working environment of the mine, the enactment into law of the Mine Safety Act of 1969 has imposed particularly stringent regulations in order to protect the health and safety of the working miners. For instance, the permissible limit on the quantity of dust is about 2 mg/cu.m, while the amount of methane gas is continuously monitored so as to detect in advance any build-up well before the danger level is approached. For instance, the working face may be inspected with a methane detector every $\frac{1}{4}$-$\frac{1}{3}$ hour or so and, in addition, the continuous mining machine itself will frequently incorporate an automatic methane sensing instrument which will automatically discontinue the supply or power to the machine in the event a significant change in methane content occurs.

In order to reduce the hazards of the ore dust and ignitable gas, mining operators long ago developed techniques for ventilating the mine so as to induce reasonably strong currents of fresh air therein. Bearing in mind that as the extraction of the coal proceeds over long periods of time, an involved system of shafts, tunnels and corridors can evolve which can take on nearly labyrinthian proportions, it will be immediately apparent that if the required currents of fresh air were to be created throughout the entire open area of such a mine, the cost would be completely prohibitive. In order to bring this cost within tolerable limits, mining operators and companies adopted the practice of suspending flexible cloth curtains, called brattice cloth, in appropriate locations so as to confine the flow of the air as closely as possible to the region immediately contiguous to the working face of the coal seam by closing of those rooms in which the ore extraction had been concluded or temporarily interrupted as well as side tunnels or corridors not currently in use. These curtains can be hung along lines which can be curved as necessary to act as partitions for confining and directing the air flow as desired and in that instance are referred to as line brattice. Also, it is common to provide a temporary closure across the tunnel or shaft which serves for ingress and egress to the working area of the mine as well as for the transportation of the extracted coal out of the mine, and these partitions usually are referred to as check or fly curtains.

DESCRIPTION OF THE ART IN GENERAL

The most common material employed for brattice cloth in the past has been a heavy woven jute fabric weighing initially in the other of about 10 oz/sq.yd. While jute has the virtue of low cost over other conceivable fabrics, it must be imported from foreign countries, and this cost advantage is gradually disappearing as the exporting countries increase their price. On the other hand, jute is subject to major disadvantages. In the first place, jute has a high natural absorptivity for moisture so that moisture can be absorbed in an amount to actually equal its starting weight and this moisture tends to attract and hold airborne dust particles. From one aspect, this property is desirable since the woven jute fabric suffers from a high initial porosity and actually becomes an effective brattice cloth only after a sufficient amount of moisture and sut has been accumulated as to reduce this porosity. From a different aspect, this property is undesirable since it causes the fabric to become wet and soggy and to undergo a loss in tensile strength so that it tends to become easily torn or dislodged from its mountings. Moreover, it is preferable from the mine operator's viewpoint for a given bratice cloth to be reused as frequently as possible by moving it from location to location as the coal extraction proceeds, and such reuse becomes inconvenient and difficult from the miner's standpoint when the brattice cloth is wet and soggy. Consequently, the working miners tend to discard used jute brattice and install a fresh unused fabric at the next location rather than to undertake the unpleasant task of detaching and rechanging the already used cloth.

More recently, the jute fabric has been laminated with polyethylene film to gauges up to about 3 mil so as to increase the initial air imperviousness of the fabric, but this expedient materially increases the fabric cost and does not significantly change the absorptivity of the jute and the economic drawbacks caused thereby.

An alternative to jute that has been in considerable use is cotton duck or canvas woven to give a basic weight of 10 oz. or higher per square yard. While such canvas is of much reduced porosity compared to jute and is superior for that reason, it likewise suffers from a high absorptivity for moisture with concomitant attraction for dust particles which can result in an increase of as much as about 75% of its starting weight. Therefore, while cotton canvas gives more efficient air control than jute, it is considered on a virtual par with jute as regards its potential for reuse.

Attempts have been made to employ plastic sheeting with the expectation of obtaining greatly increased air control efficiency due to the completely impervious nature of this material. However, plastic sheeting is relatively expensive and when employed in weights sufficiently low as to be acceptable from a cost standpoint, the curtain formed thereby lacks the weight necessary to withstand air currents and provide the desired confining effect on the air currents. Instead, such sheets tend to blow or flap uncontrollably when exposed to passing air currents and significantly lose air moving effectiveness. In addition, a sheet plastic tends to have low tear and abrasion resistance and does not adequately withstand the normal wear and tear of contact with the working miners and their equipment; when snagged or torn in use, the tear tends to propagate or spread through the sheet when it then must be discarded and replaced with fresh material at additional cost.

More recently, a composite plastic brattice has been developed wherein a relatively heavy woven scrim of nylon filament is coated on both sides with polyvinyl chloride so as to provide reinforced plastic sheeting. This composite material is quite efficient in controlling and moving the air flow due to its imperviousness and sufficient hanging weight to remain in place, and since it has virtually no absorptivity for moisture, it can be removed and reused with ease. However, this material is far more costly than conventionally used fabrics and its use up to the present time has tended to be limited to special situations, such as fly curtains, where relatively small amounts of material are needed and the additional cost can be justified by reason of the highly increased durability of this fabric to meet the unusual requirements of these situations.

PRIOR PATENTS

The patented art of which I am aware in this field typified by U.S. Pat. Nos. 3,006,267; 2,947,239; 3,118,363; 3,404,756; 3,636,852; 3,715,969 and 3,863,554, is concerned with improvements in the mechanical support or arrangement of brattice cloth and makes only general reference to the actual construction of the cloth itself along the above-described lines.

OBJECTS OF THE INVENTION

The objects of the invention are, therefore, to provide a brattice cloth or fabric of improved construction which will combine in large measure all of the advantages found in the prior art materials without their attendant disadvantages so as to provide a more effective material for use in the ventilation of underground mines.

A second object is to provide an improved brattice cloth construction which can be manufactured and sole at a cost roughly comparable with that of fabrics used widely for this purpose in the past and which will be within the tolerable cost limitations imposed by the mining operator, will possess the density and low porosity required for the efficient control of air currents and will have high coherency or integrity with low moisture absorptivity to enable it to be reused conveniently by the miners.

BRIEF DESCRIPTION OF THE DRAWINGS

FIG. 3 is a schematic plan view illustrating the method of assembly and impregnation of the brattice cloth of the invention;

FIG. 4 is an enlarged detail view in elevation of a preferred close-barbed felting needle preferably employed in the needle punching of the present improved brattice;

FIG. 5 is an enlarged cross-sectional view taken alone lines 5—5 of FIG. 4;

FIGS. 6 and 7 are enlarged detail views illustrating in idealized fashion the effect of the needle punching operation in forming the brattice cloth of the invention.

GENERAL DESCRIPTION OF THE INVENTION

Figure 1:
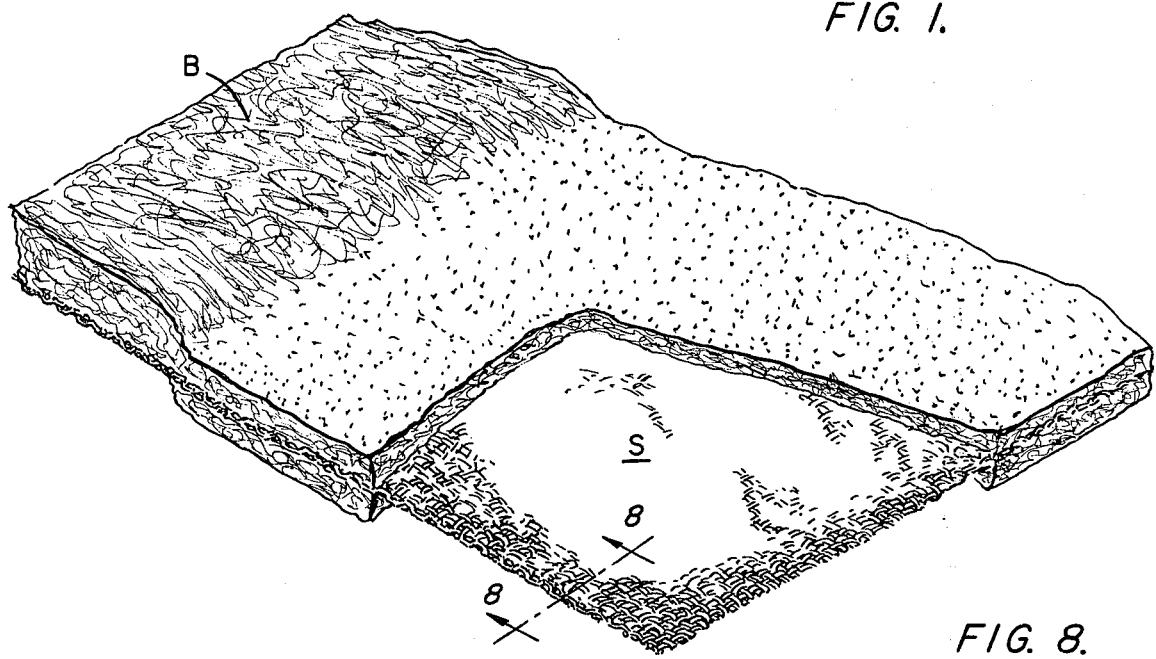
FIG. 1 illustrates in higly schematic and idealized fashion a plan view of a portion of an undergound mine including at its right end the active face of the seam at which the mining operation is currently concentrated and showing the generalized locations of brattice cloth sections for controlling the flow of air through the depicted region.
Figure 8:
FIG. 8 is an enlarged detail view of a preferred substrate used in the present brattice cloth.

In general, the improved brattice cloth construction of the present invention utilizes the following components: a dense coherent felt or blanket formed from at least one batting or mat, designated B, of textile staple fibers needle-punched into tight intertwined engagement, a fire retarding chemical impregnant, not visible in the drawings, in sufficient amount to impart to the staple fiber felt an acceptable flame resistance, and preferably an interior openwork supporting web, referred to for convenience as the substrate, disposed within the body of the stape fiber felt. Each of these components will be described in turn.

THE STAPLE FIBER FELT

The staple fiber felt or blanket employed herein is produced from a relatively thick, fluffy and lightweight batting composed by a more or less random array of staple fibers of any textile material having a minimum length of around 1 inch up to a maximum of about 6 inches or so. Such battings can be constituted of one or more layers of card web produced with a textile carding machine or, preferably for reasons of expense, of a garnett web made with a garnett type carding machine from the waste fibers from conventional textile operations. Alternatively, the batting can be formed by known air-layering techniques in which fibers are more or less individually dispersed into an air current and collected on a moving screen in layers of a given thickness which can then be removed and collected in roll form. The overall weight of the batting will again ultimately be determined by the final weight selected for the finished brattice and, of course, by the proportion of the weight provided by the substrate, but in general will normally fall within the range of about 5–9 oz/sq. yd. As regards tensile strength, the fiber batting due to its soft flimsy nature has little or no inherent tensile strength. The batting is formed of fibers of any material known to be useful for textile purposes, such as cotton, rayon, polyester, nylon and so on, including mixtures thereof. Synthetic textile fibers are preferred due to their natural tendency towards hydrophobicity in that their susceptibility to the pick-up or absorption of moisture from the ambient atmosphere is less than the more hydrophilic natural textile fibers. The size of denier of the staple fibers for the batting does not appear to be critical and can be within the range of that useful for ordinary textile fabric purposes, for instance 1 to 15 denier. In its initial state, the batting will usually have a thickness exceeding the thickness of the ultimate brattice cloth due to its soft, fluffy, flimsy character. Starting thicknesses in the relaxed or uncompressed state in the range of about $\frac{1}{2}$–4 inches are quite satisfactory. This thickness is not a limitation except to the extent it influences the ultimate thickness of the completed brattice fabric which should lie roughly in the range of about 1/16 to $\frac{3}{8}$ inch after being densified and compacted by the needle punching operation.

As will be explained in detail subsequently, an important feature of the present invention is the control of the needle punching operation in such fashion as to convert the loose fluffy batting into a dense coherent felt or blanket wherein the staple fibers are so intertwined and interengaged as to strongly resist separation. Where a substrate is present, the needle punching should result in displacing a significant proportion of the fibers in the batting from their starting position on one or both of the sides of the substrate entirely through openings in the substrate (due to its openwork or reticulated character or created in the course of the needle punching by penetration of the needles) to the opposite side of the substrate where they remain after withdrawal of the needles. This requires a staple fiber of considerable length and, as indicated above, a length of about 1 inch has been found to constitute the approximate minimum with higher lengths in the order of 2–3 inches or more being preferred. Somewhat shorter lengths of staple may be possible if a lesser loss in tensile strength is tolerable or subject to compensation by a stronger substrate or other ways. Six inches appears to be about the practical maximum. Blends of staple fibers of several lengths are possible and may give optimum results.

The batting can be made by combining a plurality of layers of card or garnett webs into a single thick mat which is then subjected to needle punching. If desired, the batting can be formed of two parts, one arranged on each side of the substrate but this arrangement requires two passes through the needle punching unit and is disadvantageous for that reason. If employed, the thickness of the two separate batts would be selected so as to together equal a thickness in the range specified above.

Where the substrate is omitted, a greater proportion of the weight of the brattice must necessarily be supplied by the staple fiber felt, particularly if very heavy brattices are desired.

THE SUBSTRATE

The substrate used herein as a preferred component is a thin flexible reticulated or openwork web or sheet constituted of filamentitious elements arranged in some kind of assembly having openings therein. One example of substrate is a scrim or "cheesecloth" made by weaving twisted strands spun from cotton or rayon staple fibers having an average denier in the range of about 15 to 100 or higher into a loose open fabric having a basis weight of about 1–3 oz/sq. yd. Alternatively, a synthetic scrim produced in about the same denier range by the extrusion of synthetic mono-filaments which are fused together at their intersections either during the extrusion or subsequently thereto into a coherent reticulated sheet would be satisfactory.

The preferred substrate is made by weaving thin flat ribbons or tapes of a polyolefin resin, such as polyethylene or polypropylene, having a widthwise dimension substantially greater than their thickness, for instance, a thickness of 2–3 mil and width of about 50–200 mil and a denier of about 400–1500. Such ribbon-like filaments can be woven closely together using any suitable fabric construction into a relatively tight flexible sheet that is especially well adapted to the needs of the substrate of the invention. Fabric constructions found useful with the preferred substrate can vary in picks per inch in the range of about 24–28 warp ends per inch of a $2 \times 50$ mil 500 denier tape to about 8–11 filling ends per inch of a $2 \times 100$ mil 1000 denier tape for a more dense construction to about 10–12 warp ends per inch versus 6–12 filling ends per inch, both for tapes of $2 \times 100$ mil 1000 denier tapes, for a somewhat looser construction. Instead of flat ribbons, loosely twisted multi-filament yarns having an overall denier in about the same range with the individual filaments varying from about 15 to 50 denier can be substituted or more or less square mono-filaments having a width of about 3 mils versus a thickness of about 2.5 mils. Reticulated sheets which are woven from such polyethylene and polypropylene tapes for use in backing in the manufacture of carpets by the needle tufting or needle loom method are currently available at relatively low cost on the open market and serve very well as the substrate of this invention.

Another suitable type of substrate consists of a randomly swirled arrangement of synthetic filaments bonded together into a thin somewhat porous sheet such as is sold in various weights under the trademark "TYPAR" by the du Pont Co. While these spun bonded sheets lack the regular pattern of woven substrates, they can be readily penetrated by the needles during needle punching while the random intersections of the filaments thereof impart good resistance against tearing and splitting.

It is deemed important that the substrate be reticulated or openwork in nature as contrasted with a solid continuous film or sheet. Since the substrate is subjected to rather severe needle punching during the manufacture of the brattice cloth of the invention, the presence of discontinuities in the openwork substrate better accommodates the penetration of the needles during the needle punching operation without incurring major structural damage to the substrate, particularly since the substrate can be coated with a lubricant to facilitate penetration as is known in the art. A solid plastic sheet, on the other hand, appears to undergo serious disintegration during the needle punching operation so as to lose substantially its integrity and coherency.

The function of the substrate in the present assembly is primarily to function as a matrix into which the staple fibers of the batting can be most effectively anchored and interconnected with a minimum amount of needle punching. An additional optional but preferred contribution of the substrate is that of conferring a basic tensile strength to the finished assembly and reducing the proportion of staple fibers. A continuous plastic film has been found poorly suited to these functions; the tear strength of continuous film tends to be so low that the needle-punched staple fibers are not securely embedded therein, and the tensile strength of the film following the multitudinous perforations of needle punching is severely degraded. Reticulated or openwork webs made either by extrusion, spun bonding, or weaving are free of the latter disadvantages and thus satisfy all requirements. The woven scrims of natural fiber yarns tend to be somewhat low in initial tensile strength, unless their size is increased with a consequential increase in cost, but have been found acceptable as regards the other criteria.

The weight of the substrate alone will depend somewhat upon the ultimate weight desired for the final complete brattice cloth, but in general will lie within the range of about 1-5 oz/sq.yd. and preferably about 3-4 oz/sq.yd.

CHEMICAL IMPREGNATING AGENT

There are known in the art a variety of chemical impregnating agents which can be applied to the assembly of batting and substrate to confer an improved level of flame resistance. A convenient summary of such chemicals has been published in chart form under the title "A Guide to Flame Retardant Chemicals" in the July 1974 issue of America's Textile Bulletin/Reporter to which reference may be had. This "Guide" specifies the chemical nature of a broad variety of known chemical retardants, the commercial supplier, the manner in which they are usually applied, e.g. in acqueous solution or emulsion form or as a powder, the materials with which they have been typically employed in the past, the end use of the treated materials, the percentage of weight increase from the impregnation, the durability of the impregnation to washing, dry cleaning and the like, and the cost where available.

One useful impregnant is inorganic boron compounds, such as boric acid or borax and preferably a mixture of the two. This agent is cheap and can be applied in acqueous solution to the fabric but has a slight disadvantage of a tendency toward releasing dust particles of the impregnant when disturbed. For the same reason, other inorganic fire retardants, such as inorganic oxides and heavy metal compounds, i.e. of antimony and the like, are less preferred. Dibasic ammonium phosphate is also suitable. Halogenated organic compounds, particularly halogenated phosphorus compounds such as the ammonium salt of mixed mono-and dibromopropyl phosphorus acid have proved particularly useful, especially in conjunction with polyester staple fibers.

It is slightly preferred that the impregnating chemical have a relatively low corrosive action for commonly used fastening elements such as nails, screws, bolts and the like. Some fire retardants, such as ammonium sulfamate, tend to be rather corrosive to iron fasteners and the like so as to cause fairly rapid rusting when in contact with the impregnated fabrics. This is disadvantageous when the fabric must be suspended from the ceiling of the mine by fasteners of this type not only in lessening the security of the fastening but in reducing the re-usability of the fabric due to staining and corrosion products that it acquires. However, the length of time that a given section of line brattice will remain at a single location will usually be short compared to the time for the corrosive effect to become serious.

At the present time, the agent imparting flame retardency is not required to be durable with respect to leaching by immersion in water. In the event durability does become a requirement, it might be desirable to combine the flame regarding agent with a relatively water-insoluble adhesive or binding agent, such as a thermo-settable resin, to select one of the more durable types of agents, or to employ a hydrophilic staple fiber material having a high natural absorptivity for the regarding agent.

The amount of the fire retarding impregnant to be applied to the batting-substrate assembly will be largely determined by the inherent flame resistance of the staple fibers selected for the batting. Most synthetic staple fibers, e.g. nylon and polyester, tend to have a relatively high inherent flame resistance so that less impregnant is needed for battings constructed of these materials. With some synthetic materials, such as the so-called modacrylics or modified polyesters, where the polymer chain is modified by the addition of groups such as vinyl chloride which reduce the flammability of the fibers substantially, it may be possible to eliminate the added flame retarding agent completely and the phraseology "in sufficient amount to impart the required flame regardancy", or equivalent, is intended to embrace this possibility. On the other hand, natural staple fibers such as cotton and rayon, and certain synthetic materials such as acrylics, are known to possess a substantially lower flame resistance so that greater amounts of the chemical are required to compensate for this low natural resistance and achieve the necessary overall resistance level. Generally speaking, a useful amount of impregnant in the case of the preferred agents and the common and relatively inexpensive staple fibers identified above has been found to be about 1-2 oz/sq.yd. on a dry weight basis.

The ultimate flame resistance of the finished brattice cloth must be sufficient to meet whatever regulatory standards are applicable at the time to the mining industry as promulgated by the Mine Enforcement and Safety Administration (MESA), now the Mine Safety and Health Administration (MSHA). At present, such regulations impose a minimum standard of a flame-spread index of not more than 25 determined according to ASTM-E-162. In carrying out this standard test, an appropriately conditioned test swatch of the fabric to be evaluated supported on a rigid non-imflammable base or suitably mounted in a frame is suspended at an inclined angle of 30° from the top downwardly in facing relation to a vertically extending radiant panel larger in dimensions than the test swatch. The radiant panel is constructed of porous refractory material and is preheated with a gas/air mixture to produce a radiant energy output equivalent to that emitted by a black body of the same dimensions maintained at a temperature of 670°±4° C. A pilot burner projecting 2–3 inch flame is arranged to impinge the flame against the top of the sample swatch so that any burning action proceeds in a downwardly direction. After the swatch ignites, if such be the case, the movement of the flame downwardly along the swatch is observed and the time required for the flame to progress at 3 inch intervals measured from the top of the sample is recorded. The maximum temperature increase occurring in the burning sample is also measured by means of multiple thermocouples arranged in a stack or hood overhanging the top of the test swatch. The flamespread index is calculated by the following formula:

$$Is = Fs \times Q$$

wherein Is is the flamespread index, Fs is the flamespread factor and Q is the heat evolution factor. In general, the flamespread factor Fs is determined by the spread at which the front edge of the flame proceeds down the specimen and will be higher in value as the specimen burns faster. The specific value for Fs employed in the above equation is calculated according to the following formula:

$$Fs = 1 + \frac{1}{t3} + \frac{1}{t6 - t3} + \frac{1}{t9 - t6} + \frac{1}{t12 - t9} + \frac{1}{t15 - t12}$$

where t3 equals the time required for the flame to reach the 3 inch mark, t6 the time for the flame to reach the 6 inch mark and so on downwardly along the sample.

The heat evolution factor is determined by the maximum temperature which develops in the sheet metal stack disposed above the burning sample as measured by the multiple thermocouples situated therein. Obviously, this temperature will increase with increasing heat of the burning flame. The exact value for Q is calculated as the product of an arbitrary constant 0.1×T, T being the maximum stack temperature rise in degrees Fahrenheit compared to an asbestos cement board control specimen, divided by a calibration constant $\beta$ which is derived for each given test apparatus by relating the observed temperature rise to actual heat input. Expressed mathematically this formula reads:

$$Q = 0.1 \frac{T}{\beta}$$

As mentioned above, a brattice cloth must have the highest flamespread rating possible according to ASTM-E-162 of not more than 25 or less in order to be approved for practical use in underground mines and the brattice cloths of the present invention have been found to fully meet this requirement with an actual flamespread index in the order of about 2–5.

In addition to the flamespread index test determined as above, industry has developed "small scale" tests for evaluating the flame resistance of textile samples in a simpler and less cumbersome fashion. One such test, officially designated NFPA No. 701 (1969), §31, is commonly referred to as the "match" test and announcement has recently been made by MSHA of its intention to modify its present regulations to incorporate this test in addition to the flamespread test. The match test involves holding the lower edge of a vertically disposed test swatch in contact with a burning flame, such as a match although a gas burner is officially specified, for a time interval of 12 seconds and then measuring the vertical extent to which the fabric has been blackened by the flame. A flamespread in the "match" test of up to 4½ inches is considered acceptable, while a flame spread of 5 inches or higher indicates that the fabric is too flammable for acceptability. It is thus preferred that brattice cloth of the invention likewise meet this alternative test standard and this has proved to be readily achievable with fabrics constructed as described.

METHOD OF MANUFACTURE

In manufacturing the brattice cloth of the present invention, an arrangement generally as indicated in the flow sheet FIG. 3 of the drawings is preferably employed. Thus, a roll of each of the selected substrate and batting designated S and B are mounted on appropriate supporting shafts 10 and 12 and brought together in sandwich fashion between a pair of driven feed rolls 14 for delivery across a fixed backing plate 16 which supports the substrate for purposes of a needle punching operation. On the side of the sandwich opposite the substrate and plate 16 and adjacent the compressed batting is situated at least one needle punching unit 18, sometimes referred to as a "needle loom"; more than one such unit, e.g. two units, 18a, 18b, as shown in FIG. 3, can be employed if desired. An inclined guide plate 17 is situated at the entrance to the needle punching unit to compress the batting for passage through the unit. Each needle punching unit includes an array of needles 19 mounted on a rigid needle board (not seen) and projecting perpendicularly to the path of the sandwich. The needle board of each unit is reciprocated at a high rate of speed towards and away from the batt of the sandwich so as to penetrate the ends of the needles carried thereby through the sandwich. It has been found that a minimum of about 200 punches per square inch of sandwich area is required in order to achieve the desired dense tight fabric construction for the brattice cloth of the invention. If the substrate is omitted, a much higher degree of needle punching may be necessary, in the order of 1000–2000 punches per square inch to produce the same density and integrity.

Obviously, the number of needle punches per given area will be determined both by the density of needles on the needle board as well as the number of strokes or reciprocations per minute undergone by the needle board in relation to the selected rate of advance of the sandwich being needle punched. The number of needles is usually designated in terms of the number of needles per inch of board width, i.e. the number of needles present in a one inch strip of board equal to the board length in the direction of material movement (which is typically about 15–16 inches) and ranges from about 32–250 (which is equivalent to about 12–16 needles per square inch of area). A specific useful number of needles is 109 per inch of board width for a 16 inch board.

Plural stages of needle punching units can be used or the material passed a plurality of times through a single stage.

Acceptable results with the preferred embodiments including the substrate have been obtained using two punching units containing that number of needles operating at 600 strokes per minute and a sandwich speed of 30 feet per minute to give about 200 punches per square inch of product area, (although a slower speed of about 20 feet per minute might be preferable) and a single unit with 50 needles per board inch operating at 300 strokes per minute and a linear speed of about 4.5 feet per minute to give about 300 punches per square inch of area. A more uniform fabric with better distribution and coverage by the staple fiber results with about 300 or more punches per square inch. The maximum speed is about 30 feet per minute with a reciprocation rate of 1000.

Figure 2:
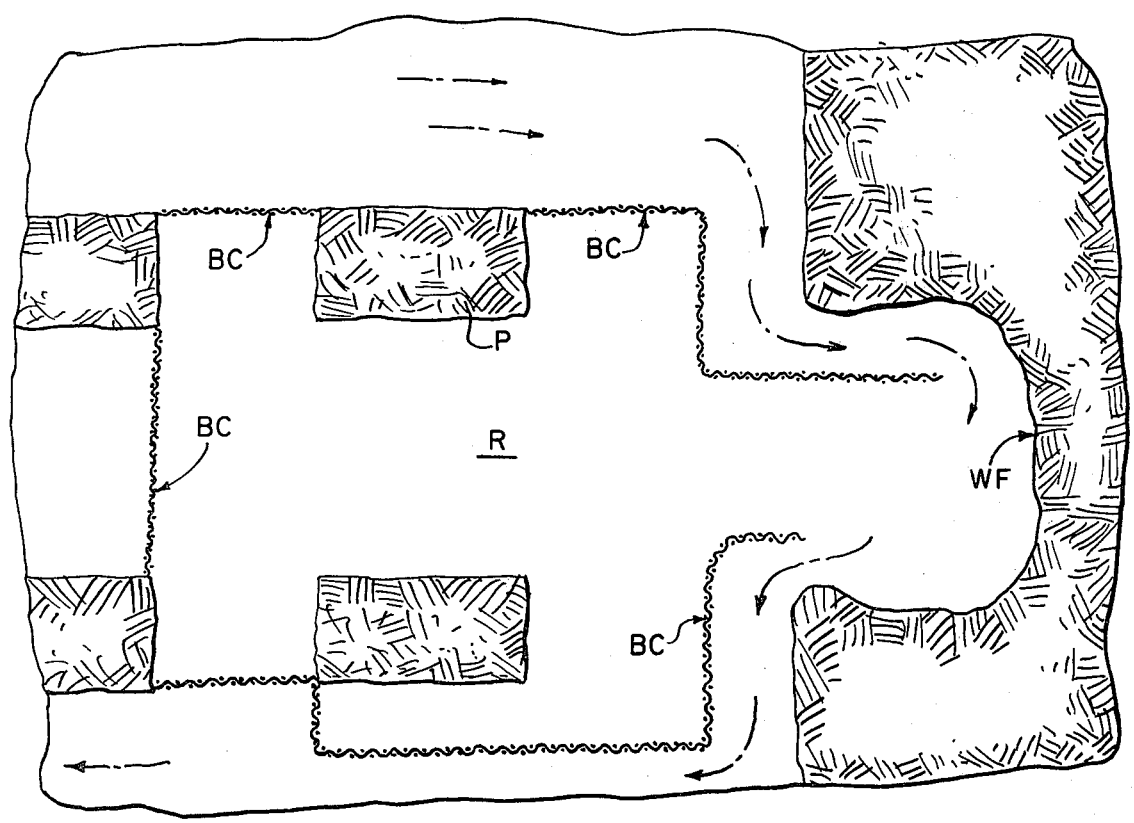
FIG. 2 is an enlarged detail view of a brattice cloth construction according to the present invention in which outer portions have been broken away in certain regions so as to reveal the interior substrate.

While various types of punching needles may undoubtedly be employed in the needle punching unit of this invention, it is preferred that the needle be of the so-called close-barbed type as illustrated in FIG. 2 of the drawings. Such a needle has a tubular shank 9 with a right angular crook 18 for embedment in the supporting board while the working end 13 of the needle has a triangular cross-sectional configuration as shown in FIG. 5. A number of barb protrusions or "kick-ups" 15 are formed along the working end of the needle in a staggered generally helical fashion therearound as suggested in the drawings. The points of the barbs 15 must be inclined generally in the direction of the staple fiber to be punched rather than in the opposite direction.

As illustrated in FIGS. 6 and 7 in idealized fashion, when such a needle is penetrated through the sandwich of batting and substrate as illustrated, the barbs become engaged with the staple fibers of the batting and at least partially displace such staple fibers substantially within the batting and entirely through the substrate to the opposite side of the substrate when present. This, of course, occurs repeatedly as the needles reciprocate so that more and more of the staple fibers undergo such displacement. In addition, the staple fibers become entangled, intermeshed and intertwined with one another and with the filaments of the substrate. The result is a dense, substantially compacted (compared with the starting batting thickness) felt-like assembly which has a high coherency and integrity due to what amounts to a virtual integral mutual embedment of the punched staple fibers and in the substrate. As indicated above, the ultimate thickness of the dense compacted felt-like assembly is approximately in the range of 1/16 to ⅜ inch.

An important condition of the needle punching operation is an increased distance of penetration of the punching needles through the batting or substrate compared to normal needle punching of carpets and the like, namely, a penetration sufficient to project the needle point a distance of at least ⅓–⅝ inch beyond the opposite surface of the substrate. The usual practice in the needle punching art of employing a much less extent of penetration is inappropriate for the present fabric because it fails to achieve the required displacement and interengagement of the fibers and produces only a thin layer of displaced staple fibers on the opposite side of the substrate (rather than the generally balanced preferred construction of the invention where the fibers are situated in nearly equal amounts on the opposite faces of the substrate) and do not achieve the tight, compacted, dense, coherent construction that achieves the low air porosity characteristic of the present brattice cloth.

The spacing of the barbs along the needle end can vary depending upon the number of needle punches per inch that is desired, but the best results have been obtained using so-called "close-spaced" needle barbs having a barb approximately every 5 6/32 inch along the working end 13 of the needle. In this way, maximum displacement of fibers per stroke is possible.

After completion of the needle punching operation, the needle-punched sandwich is passed by means of appropriate guide rolls 20 through a vat 22 of the fire retardant chemical impregnant to emerge through a pair of squeegee rollers 24 which compresses the impregnated assembly to remove excess amounts of impregnating liquid and achieve the desired level of pickup. Then the treated assembly, if necessary, is delivered to a take-up roller where it is collected into rolls. Preferably, drying means such as an oven is interposed between the squeegee rollers 24 and the take-up roller 26 to dry the impregnation before take-up. Obviously, the impregnant can be applied in other ways, e.g. padding, spraying etc.

THE FINAL BRATTICE CLOTH

In completed form, the brattice cloth of the present invention has the appearance of a dense, compact, felt-like thin blanket which can be easily flexed or bent as desired, but tends to return to its original flat condition when the bending stress is removed. The surface is fairly smooth and even, with few loose fibers and little, if any, nap and has a somewhat pitted, orange-peel-like aspect. The feel or handle of the cloth is rather coarse and may range from fairly soft to somewhat harsh depending upon the type and size of filling used in the batting. Cotton and rayon fillings tend to impart a softer more uniform surface, particularly in the preferred small denier of about 3–5, while nylon tends to be somewhat coarser, again dependent on the size of the staple fibers. The final thickness of the brattice cloth is preferably in the range of about 1/16 to ⅜ inch. As explained above, the nature of the needle punching is such that any substrate is disposed in the interior of the final felt-like blanket even though it may originally be situated on one exterior side. Preferably, the batting staple fibers are more or less evenly distributed on the opposite sides of the substrate, although one side may have somewhat more staple fibers than the other without causing significant disadvantages up to a distribution of about 70/30.

The weight of the cloth when completed must be sufficient that the cloth will hang in generally stable condition when exposed to the usual air currents within a mine and not flap or blow uncontrollably. It has been found that a weight or density of about 7–8 ozs/sq.yd is the minimum that will suffice for this purpose and a weight of at least about 10 oz/sq.yd, is better. The maximum weight is determined by economic considerations since once the optimum performance in terms of conveying or "moving the air" is achieved, additional weight is not accompanied by a commensurate increase in performance. At present material cost levels, an upper limit of about 20 oz/sq.yd. seems to be about the highest that is economically feasible.

The tensile strength of the final brattice cloth should be at least about 70–75 pounds measured on the Scott scale in both the warp and filling direction. Somewhat higher Scott values in the order of 125–150 pounds are better, although at the present time the U.S. coal mining industry has no defined minimum or maximum tensile specifications applicable to brattice cloth. A typical cloth according to this invention has a Scott tensile strength of 94 and is entirely adequate. It has been found rather surprisingly that the interengaging effect of the needle punching operation on the sandwich of batting staple fibers and openwork substrate produces a substantially higher net tensile strength than would be expected on the basis of the tensile strengths of these components separately. Apparently, the repeated penetration of the barbed felting needles, by carrying intermediate loops and occasionally end portions of staple fibers into and through the substrate, causes the staple fibers to become securely interlocked and interengaged with one another and with the substrate and form an integrated assembly which is virtually inseparable. This assembly has a remarkably high degree of coherence or bodily integrity comparable to a true woolen felt notwithstanding the absence from the staple fibers, especially those of synthetic derivation, of the well known hooked fibrous morphology of wool which is responsible for its felting action. In the absence of the substrate, extensive needle punching will serve to achieve the same combination of desirable characteristics to a generally acceptable level.

While the brattice cloth of the invention can be suspended by means of furring or lattice strips anchored with the usual metallic fasteners, this is not necessary inasmuch as the coherency of the present cloth is sufficiently strong that it will support its own weight when suspended from fasteners directly driven therethrough even after reasonably long periods of use in the mine. Thus, the present cloth lends itself well to the preferred mining practice of attaching the brattice to wooden headers associated with the roof bolts.

The arrangement of brattice cloth in the mines in practice will require no explanation to the experienced miner, but for the purpose of conveying a general idea of such usage, reference is made to FIG. 7 which shows a simplified and highly idealized plan view of a portion of an underground mine. This mine is being mined following the "room and pillar" approach, and in FIG. 7 the several rooms are designated R, while the pillars are designated P. At the right end of the depicted region, a new "room" is being formed by the extraction of coal along the working face of the seam designated WF. Sections of brattice cloth BC are shown extending across some of the completed rooms as well as across intersections with adjacent corridors C so as to isolate these regions from the region adjacent the working face as regards the flow of air therethrough. In addition, in order to concentrate the air flow in the working face region, additional lengths of brattice cloth can be strategically located so as to positively direct the air current direction to the immediate vicinity of the face WF, as indicated by the dash-dot arrows.

Through the foregoing description, various alternatives and modifications have been identified and others will be apparent to the skilled worker in the art. It is accordingly to be understood that the invention is not intended to be restricted to the specifically disclosed features except as required by the limitations of the appended claims.

What is claimed is:

1. In a method of ventilating an underground mine in which the flow of ventilating air is directed to active working areas of the mine and substantially excluded from non-working areas and corridors by means of flexible brattice cloth curtains disposed in appropriate locations across the openings to said non-working areas and corridors, the improvement wherein said brattice cloth curtain comprises a dense, strong, coherent felt-like freely flexible blanket formed from at least one batting of natural or synthetic textile staple fiber having a staple length of at least one inch, all such battings together having a thickness greater than said felt-like blanket and being needle-punched to cause a substantial portion of the fibers thereof to be disposed within said batting and become entangled, interengaged and compacted into said felt-like blanket, said brattice cloth having flammability characteristics at least sufficient to withstand the "match test" as defined in the specification and satisfy any more stringent governmental promulgated standard for brattice cloth, a density sufficient to convey said flow of ventilating air within said mine, and a tensile strength sufficient to support its own weight when hung in ceiling height lengths.

2. The ventilating method of claim 1, wherein said staple fiber blanket is constituted of naturally flammable staple fibers and including a flame retarding material distributed uniformly throughout said staple fiber blanket in sufficient amount as to impart said flammability characteristics thereto.

3. The ventilating method of claim 2, including a thin, flexible, openwork or reticulated substrate disposed within the interior of said felt-like blanket and in engagement with the needle-punched fibers thereof, said substrate having a weight of about 1–5 oz/sq.yd, and the amount of such staple fiber batting and said flame retarding material being sufficient to achieve the overall weight of said brattice cloth.

4. The ventilating method of claim 3, wherein said openwork substrate is substantially penetrated by the needle-punched fibers of such batting and is sufficiently interengaged with said fibers to be integrated into said felt.

5. The ventilating method of claim 3, wherein said substrate is woven from flat ribbons of a polyolefin resin.

6. The ventilating method of claim 3, wherein said flame retarding material is present in an amount of about 1–2 oz/sq.yd.

7. The ventilating method of claim 1, wherein said battice cloth has an overall weight of not less than about 6 oz/sq.yd and sufficient to hang in generally stable condition while conveying said mine air currents.

8. The ventilating method of claim 1, wherein the staple fibers of batting are at least one member of a group consisting of polyester, nylon, cotton or rayon.

9. The ventilating method of claim 1, wherein said staple fiber has a length in the range of about 1–6 inches and a denier of about 1–15.

10. The ventilating method of claim 1, wherein said batting is needle-punched with at least about 200 needle penetrations per square inch.

11. An improved brattice cloth ventilating curtain for conveying a flow of ventilating air within underground mines which comprises a dense, strong, coherent felt-like freely flexible blanket formed from at least one batting of natural or synthetic textile staple fiber having a staple length of at least about one inch, all such battings together having a thickness greater than said felt-like blanket and being needle-punched to cause a substantial portion of the fibers thereof to be disposed within said batting and become entangled, interengaged and compacted into said felt-like blanket, said brattice cloth having flammability characteristics at least sufficient to withstand the "match test" as defined in the specification and satisfy any more stringent governmental promulgated standard for brattice cloth, a density sufficient to convey said flow of ventilating air within said mine, and a tensile strength sufficient to support its own weight when hung in ceiling height lengths.

12. The brattice cloth of claim 11, wherein said staple fiber blanket is constituted of naturally flammable staple fibers and including a flame retarding material distributed uniformly throughout said staple fiber blanket in sufficient amount as to impart said flammability characteristics thereto.

13. The brattice cloth of claim 11 having an overall weight of not less than about 6 oz/sq.yd and sufficient to hang in generally stable condition while conveying said usual air currents.

14. The brattice cloth of claim 13, including a thin, flexible, openwork or reticulated substrate disposed within the interior of said felt-like blanket and in engagement with the needle-punched fibers thereof, said substrate having a weight of about 1–5 oz/sq.yd, and the amount of such staple fiber batting and said impregnant being sufficient to achieve the overall weight of said brattice cloth.

15. The brattice cloth of claim 14, wherein said openwork substrate is substantially penetrated by the needle-punched fibers of said felt and is in integral interengagement therewith.

* * * * *